(12) United States Patent
Xiao et al.

(10) Patent No.: US 11,428,620 B2
(45) Date of Patent: Aug. 30, 2022

(54) HIGH-TEMPERATURE AND HIGH-PRESSURE MICROSCOPIC VISUAL FLOWING DEVICE AND EXPERIMENTAL METHOD

(71) Applicant: Southwest Petroleum University, Chengdu (CN)

(72) Inventors: Wenlian Xiao, Chengdu (CN); Yubin Yang, Chengdu (CN); Jitian Ren, Chengdu (CN); Wanfen Pu, Chengdu (CN); Shuaishuai Liu, Chengdu (CN); Xiao Guo, Chengdu (CN); Yongming Li, Chengdu (CN); Kun Wang, Chengdu (CN); Lingli Zheng, Chengdu (CN); Jinzhou Zhao, Chengdu (CN); Yijian Chen, Chengdu (CN); Quantang Fang, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 17/488,536

(22) Filed: Sep. 29, 2021

(65) Prior Publication Data
US 2022/0205896 A1 Jun. 30, 2022

(30) Foreign Application Priority Data
Dec. 25, 2020 (CN) .......................... 202011573226.2

(51) Int. Cl.
*G01N 15/08* (2006.01)
*G01N 33/24* (2006.01)

(52) U.S. Cl.
CPC ....... *G01N 15/0806* (2013.01); *G01N 15/088* (2013.01); *G01N 15/0826* (2013.01); *G01N 2015/0846* (2013.01)

(58) Field of Classification Search
CPC .... G01N 15/00; G01N 15/08; G01N 15/0806; G01N 15/0828; G01N 15/088; G01N 2015/0846; G01N 33/24
See application file for complete search history.

(56) References Cited

U.S. PATENT DOCUMENTS

2021/0208051 A1* 7/2021 Ju ........................... B33Y 50/02

FOREIGN PATENT DOCUMENTS

| CN | 205329623 U | 6/2016 |
|----|-------------|--------|
| CN | 106163978 A | 11/2016 |

(Continued)

*Primary Examiner* — Nguyen Q. Ha

(57) ABSTRACT

A high-temperature and high-pressure microscopic visual flowing device and an experimental method are provided by the present disclosure, comprising a seepage simulation system, a micro-displacement and metering system connected to the seepage simulation system, and an image acquisition and analysis system; the seepage simulation system consists of a visual high-temperature and high-pressure kettle, a microscopic core model placed in the visual high-temperature and high-pressure kettle, and glass carriers arranged above and below the microscopic core model; the glass carriers are provided with sealing rubber sleeves, and the visual high-temperature and high-pressure kettle is provided with an annular heating jacket; an outlet of the microscopic core model is provided with a microflow channel which is connected to the micro-displacement and metering system through a pipe, effectively reducing the metering error caused by the dead volume of the pipe.

9 Claims, 8 Drawing Sheets

(56) References Cited

FOREIGN PATENT DOCUMENTS

| CN | 207798176 U |   | 8/2018 |            |
|----|-------------|---|--------|------------|
| CN | 112444472 A | * | 3/2021 | G01N 15/0826 |

* cited by examiner

HIGH-TEMPERATURE AND HIGH-PRESSURE MICROSCOPIC VISUAL FLOWING DEVICE AND EXPERIMENTAL METHOD

CROSS-REFERENCE TO RELATED APPLICATIONS

The application claims priority to Chinese patent application No. 202011573226.2, filed on Dec. 25, 2020, the entire contents of which are incorporated herein by reference.

TECHNICAL FIELD

The present disclosure relates to the technical field of experimental facility, in particular to a high-temperature and high-pressure microscopic visual flowing device and an experimental method.

BACKGROUND

The distribution, flowing and occurrence law of single-phase fluid in porous media under reservoir conditions can be intuitively and factually studied in the high-temperature and high-pressure microscopic visual flowing experiment, but also multiphase fluid seepage experiments with different injected media and different development methods can be conducted in combination with actual reservoir geological characteristics and reservoir conditions, so as to investigate the interaction mechanism between fluids with different injected media and different development methods and the distribution characteristics of fluids in the oil displacement process. Moreover, a series of other seepage experiments can also conducted to study the nonlinear seepage pattern of reservoir rocks in the high-temperature and high-pressure microscopic visual flowing experiment. The experiments can provide constructive guidance for increasing reserves and production of target reservoirs, adjusting development plans and optimizing tertiary oil recovery technology.

However, there are many deficiencies in the microscopic visual flowing device in the prior art. For example, the Chinese patent (Publication No.: CN104100257A) discloses an experimental device and method for microscopic visual simulation of seepage formation at high temperature and pressure. The disclosure solves the technical troubles that the existing device is impossible to simulate the microscopic flow in real core under the condition of high temperature and pressure. It can characterize the microscopic seepage characteristics of underground oil and gas, the change of fluid state, and the plane seepage characteristics and oil displacement mechanism of gas injection, water injection and polymer injection in the development of complex oil and gas reservoirs. Its device can visually observe the special conditions such as fluid phase change, crystal crystallization and solid particle deposition in the seepage process in a continual, dynamical and microcosmic manner with long-focus and high-power microscope and computer metering and control technology, providing a basis for understanding the microscopic seepage mechanism of underground oil and gas reservoirs and predicting the dynamic reserves of oil and gas reservoirs. However, there are great test error caused by the large dead volume of the device, which cannot meet the experimental requirements.

The Chinese patent (Publication No.: CN109827884A) discloses a high-temperature and high-pressure visual seepage experimental device and method for authentic sandstone. In the disclosure, rock slices were taken from real reservoir and treated into a model, then placed in a high-temperature and high-pressure kettle to conduct a visual seepage experiment, which can meet the requirements for study on visual microscopic experiment that is "real" and "withstand high pressure". However, the maximum temperature and pressure which the device can withstand cannot meet the temperature and pressure conditions of some deep reservoirs, and the device has a large error in outlet fluid metering, which cannot meet the experimental requirements.

To sum up, the current design of visual seepage experimental device mainly has the following problems: 1) most microscopic visual simulation experiment devices are mainly used only at normal temperature and pressure, and impossible to study the seepage mechanism of the fluid in the reservoirs with high temperature and pressure; 2) the maximum temperature and pressure which some high-temperature and high-pressure microscopic visual seepage experimental devices can withstand cannot meet the temperature and pressure required by some deep reservoirs or meet the demand of studying the reaction mechanism of fluids in porous media with crude oil at high temperature and pressure; 3) the existing microscopic visual simulation experimental devices are disadvantaged by large error in outlet fluid metering, more dead volume and insufficient accuracy in experimental results.

SUMMARY

In response to the above problems, the present disclosure provides a high-temperature and high-pressure microscopic visual flowing device and an experimental method to study the fluid seepage pattern under reservoir conditions. The improved device is high in sensitivity and small in size, greatly meeting the requirements of most seepage experiments.

The following technical solutions are employed in the present disclosure:

a high-temperature and high-pressure microscopic visual flowing device, comprising a seepage simulation system, a micro-displacement and metering system connected to the seepage simulation system, and an image acquisition and analysis system;

the seepage simulation system consists of a visual high-temperature and high-pressure kettle, a microscopic core model placed in the visual high-temperature and high-pressure kettle, and glass carriers arranged above and below the microscopic core model; the glass carriers are provided with sealing rubber sleeves, and the visual high-temperature and high-pressure kettle is provided with an annular heating jacket to adjust the experimental temperature in the visual high-temperature and high-pressure kettle;

an outlet of the microscopic core model is provided with a microflow channel which is connected to the micro-displacement and metering system through a pipe, effectively reducing the metering error caused by the dead volume of the pipe.

Preferably, the micro-displacement and metering system comprises an inlet pipe, a displacement pump connected to an inlet of the microscopic core model by the inlet pipe, a micro-metering pump arranged at the outlet of the microscopic core model, a differential pressure transmitter arranged at both ends of the microscopic core model, and a confining pressure pump arranged on the seepage simulation system.

Preferably, the inlet pipe comprises a main pipe, and three branch pipes are sleeved inside the main pipe to set three independent flow channels of oil, gas and water respectively; the main pipe is in a circular shape, a spiral shape or a zigzag shape; a circular pipe or a spiral pipe is continuously formed as a return portion in a longitudinal direction, and the zigzag pipe is intermittently formed as the return portion in the longitudinal direction. The return portion is arranged in a water bath and the hot water in the water bath heats the inlet pipe.

Preferably, the inlet pipe is provided with a vacuum pump to avoid the air in the inlet pipe from affecting the test results.

Preferably, the image acquisition and analysis system comprises a computer, and a stereo microscope above the visual high-temperature and high-pressure kettle and a high-speed camera placed above the visual high-temperature and high-pressure kettle; the computer is connected with the displacement pump, the micro-metering pump, the confining pressure pump and the differential pressure transmitter through a data acquisition card to realize the image recognition and acquisition of pores, oil and water in the microscopic core model.

Preferably, the microflow channel is a transparent pipe with graduations, and is used to observe and record the outlet fluid volume with the stereo microscope in a real time in the seepage experiment.

Preferably, a micro mobile platform is arranged under the seepage simulation system so as to easily adjust the position and height of the seepage simulation system and facilitate observation from the stereo microscope.

Preferably, a pressure sensor is provided at an outlet of the displacement pump and at the inlet of the microscopic core model.

An experimental method for the high-temperature and high-pressure microscopic visual flowing device, using the high-temperature and high-pressure microscopic visual flowing device comprising following steps:

S1: vacuuming the microscopic core model: fixing the microscopic core model in the visual high-temperature and high-pressure kettle, and vacuuming the microscopic core model with the vacuum pump;

S2: saturating experimental water in the microscopic core model: injecting simulated water into the microscopic core model, observing a filling of injected water in the microscopic core model with the stereo microscope, and making statistics of a saturation of rock samples in the microscopic core model;

S3: establishing irreducible water saturation by a displacement of the water by the oil: slowly pressurizing the microscopic core model for water drainage by an oil displacement to reach an irreducible water state, photographing an oil-water seepage pattern during a process of the displacement of the water by the oil and an oil-water occurrence state in the irreducible water state in a real time with the stereo microscope and the high-speed camera, and obtaining irreducible water saturation of a rock sample in the microscopic core model by the statistics;

S4: conducting a water-oil displacement experiment: conducting the water-oil displacement experiment on the microscopic core model, metering a volume of driven water and driven oil by the microflow channel, observing the oil-water seepage pattern during a process of a displacement of the oil by the water, taking real-time images of an oil-water distribution during the process of the displacement of the oil by the water, obtaining on oil-water saturation in an associated state by the statistics, and calculating microscopic oil displacement efficiency until reaching a residual oil state; and;

S5: ending an experiment.

The present disclosure has the following beneficial effects:

1) the present disclosure can not only apply to the authentic sandstone micromodel in seepage experiment, but also apply to photolithographic micromodel, with a wide application range; in addition, the device can bear the maximum confining pressure of 80 MPa, the displacement pressure of up to 70 MPa, and the experimental temperature of up to 150° C., and the device can heat the fluid, and greatly meets the requirements of most seepage experiments.

2) The present disclosure achieves the purpose of metering the outlet fluid volume in different methods by arranging the micro-low channel, high-precision micro-metering pump and high-pressure microvalve at the outlet of the microscopic core model, thus greatly improving the overall metering accuracy of the experimental device to 10 nL, meeting the accuracy requirements of most existing experimental instruments.

3) The present disclosure replaces the intermediate vessel with a small curved pipe to convey the fluid to the microscopic core model, not only greatly simplifying the device structure, improving the sensitivity of the entire device, but also effectively solving the problem of heating the fluid.

4) The present disclosure can be used not only for quantitative study a series of experiments related to the microscopic seepage mechanism of the reservoir, such as the migration law of oil and water in the pore throat, the occurrence law of remaining oil, and the optimization of tertiary oil recovery technology, but also used to study on the experiments related to the nonlinear seepage pattern, condensation and anti-condensation of reservoir rocks due to the sensitive testing accuracy and resistance to high temperature and pressure of the device.

BRIEF DESCRIPTION OF DRAWINGS

In order to explain the technical solutions of the embodiments of the present disclosure more clearly, the following will make a brief introduction to the appended figures of the embodiments. Obviously, the appended figures in the following description only relate to some embodiments of the present disclosure, but do not limit the present disclosure.

DETAILED DESCRIPTION OF THE EMBODIMENTS

In order to make the purpose, technical solutions and advantages of the embodiments of the present disclosure clearer, the technical solutions of the embodiments of the present disclosure will be described expressly and integrally in conjunction with the appended figures of the embodiments of the present disclosure. It is clear that the described embodiments are some but not all of the embodiments of the present disclosure. Based on the described embodiments of the present disclosure, all other embodiments obtained by persons of ordinary skill in the art without creative effort fall within the protection scope of the present disclosure.

Unless otherwise defined, the technical terms or scientific terms used in the present disclosure should be easily understood by persons of ordinary skill in the art to which this disclosure belongs. "Include" or "comprise" and other similar words used in the present disclosure mean that the component or object before the word covers the components or objects listed after the word and its equivalents, but does not exclude other components or objects. "Upper", "lower", "left", "right", etc. are only used to indicate the relative position. When the absolute position of the described object changes, the relative position may also change accordingly.

The present disclosure is further described with reference to the drawings and embodiments.

Figure 1:
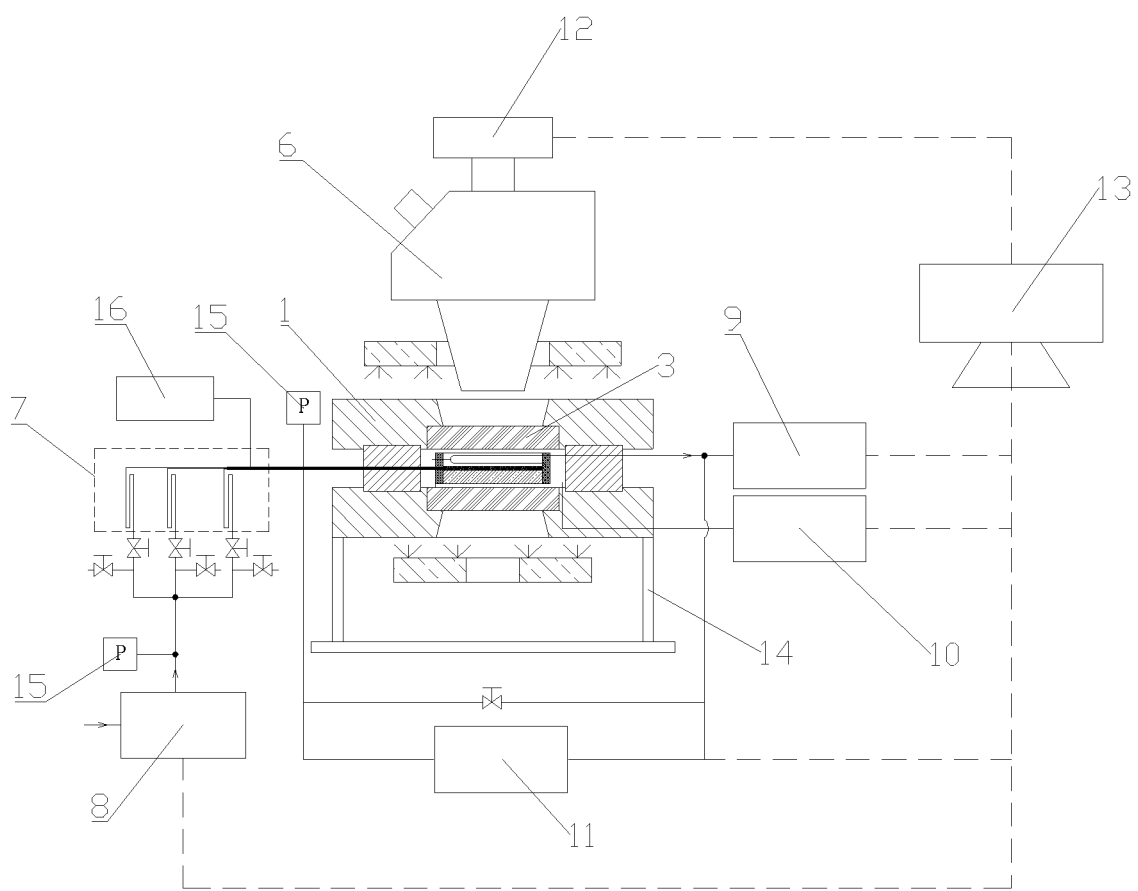
FIG. 1 is a schematic structure diagram of the present disclosure.
Figure 2:
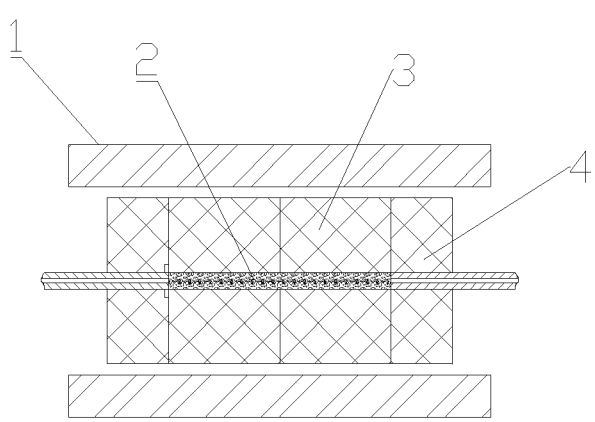
FIG. 2 is a front structural view of the visual high-temperature and high-pressure kettle of the present disclosure.
Figure 3:
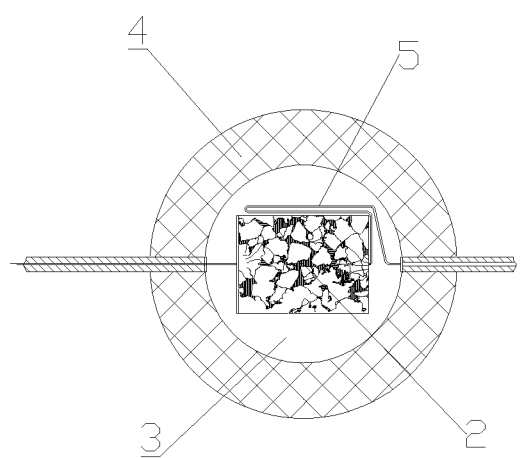
FIG. 3 is a top structural view of the visual high-temperature and high-pressure kettle of the present disclosure.
Figure 4:
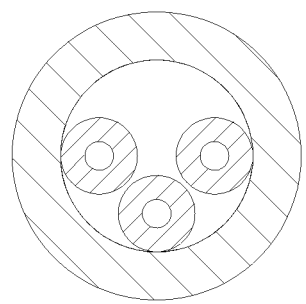
FIG. 4 is a schematic diagram of the sectional structure of the inlet pipe of the present disclosure.
Figure 5:
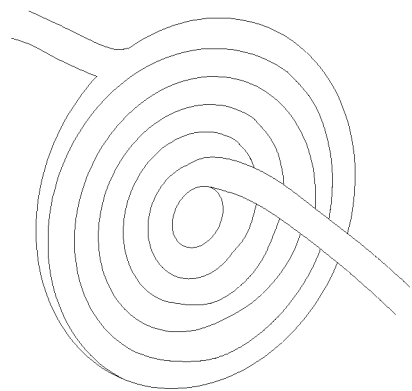
FIG. 5 is a structure diagram (circular) of the inlet pipe of the present disclosure.
Figure 6:
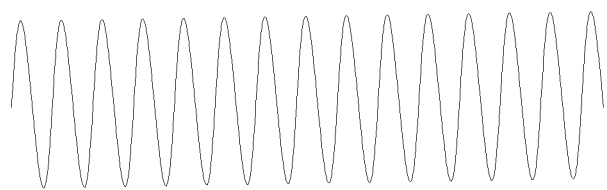
FIG. 6 is a structure diagram (spiral) of the inlet pipe of the present disclosure.
Figure 7:
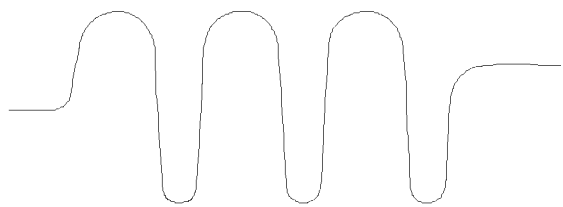
FIG. 7 is a schematic diagram (zigzag) of the inlet pipe of the present disclosure.
Figure 8:
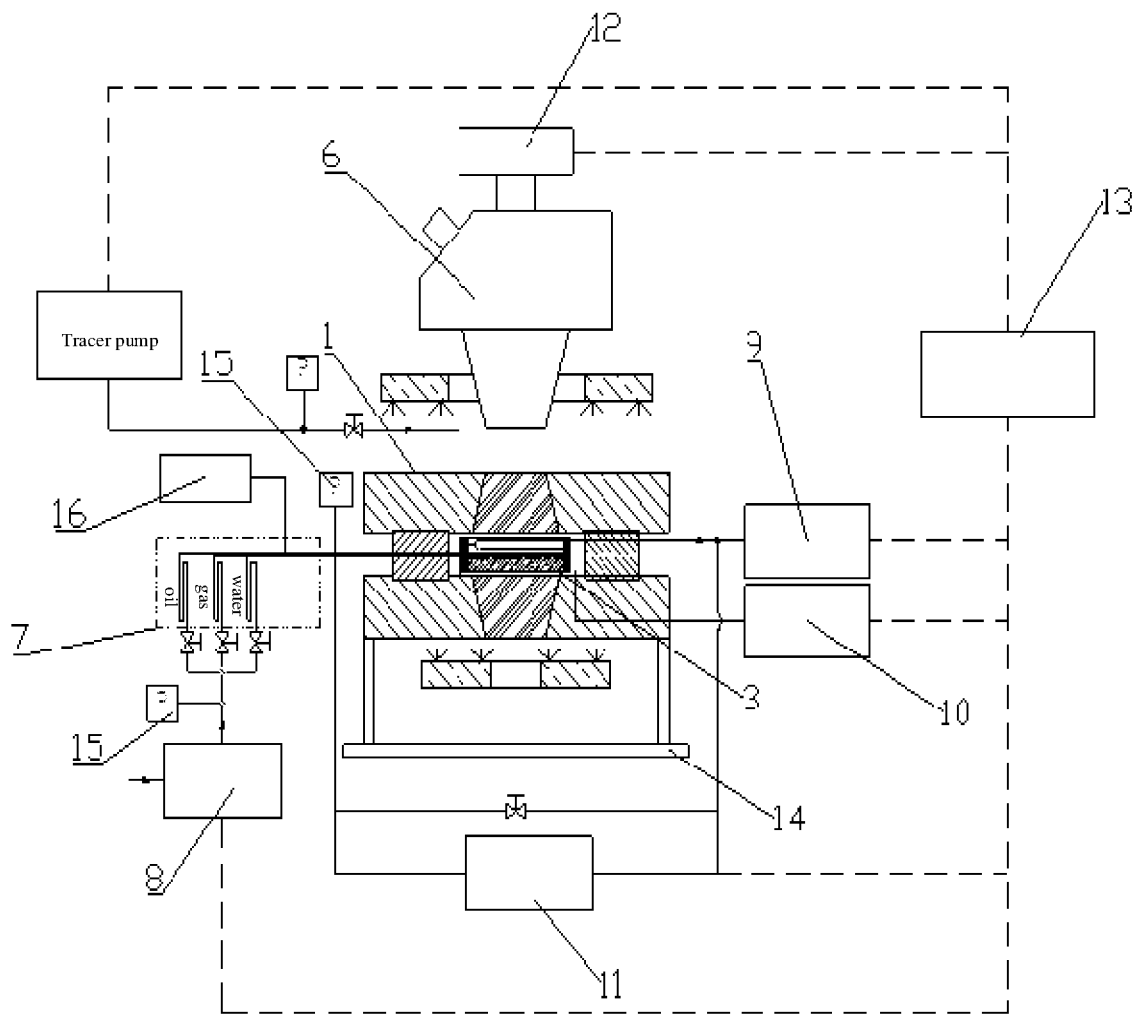
FIG. 8 is a schematic structural diagram of an embodiment of the present disclosure.

As shown in FIG. 1 to FIG. 8, the high-temperature and high-pressure microscopic visual flowing device comprises a seepage simulation system, a micro-displacement and metering system connected to the seepage simulation system, and an image acquisition and analysis system;

the seepage simulation system consists of a visual high-temperature and high-pressure kettle (1), and a microscopic core model (2) placed in the visual high-temperature and high-pressure kettle (1); the microscopic core model (2) is a micromodel of 18 mm×14 mm×0.5 mm authentic sandstone or a photolithographic micromodel of 18 mm×14 mm×50 μm with a pore throat size ≤50 μm.

The visual high-temperature and high-pressure kettle (1) is provided with an annular heating jacket with inlaid heating tube and temperature probe to adjust the experimental temperature in the visual high-temperature and high-pressure kettle (1), and the experimental temperature of the present disclosure ranges from the room temperature to 150° C.

Glass carriers (3) are arranged above and below the microscopic core model (2). The gap between the glass carrier (3) and the microscopic core model is taken as a high-pressure fluid compartment. The fluid is pumped into the high-pressure fluid compartment by the confining pressure pump (10) to load a confining pressure of up to 80 MPa to the seepage experiment of the authentic sandstone micromodel or photolithographic micromodel.

The glass carrier (3) is sapphire glass, and provided with a sealing rubber sleeve (4).

A micro-flow channel (5), a small transparent pipe with graduations, is arranged at the outlet of the microscopic core model (2), and surrounds the microscopic core model (2), and is connected to the micro-metering pump (9) in the micro-displacement and metering system through pipe. In this way, the volume of fluid in the micro-flow channel (5) at the outlet can be observed and recorded in real time through the stereo microscope (6) during the seepage experiment, thus reducing the metering error caused by the dead volume of the pipe, and achieving the accurate metering of the outlet fluid volume.

A micro mobile platform (14) is arranged under the seepage simulation system so as to easily adjust the position and height of the seepage simulation system and facilitate observation from the stereo microscope (6).

The micro-displacement and metering system comprises an inlet pipe (7), a displacement pump (8) connected to the inlet of the microscopic core model (2) by the inlet pipe (7), a micro-metering pump (9) arranged at the outlet of the microscopic core model (2), a differential pressure transmitter (11) arranged at both ends of the microscopic core model (2), and a confining pressure pump (10) arranged on the seepage simulation system.

The displacement pump (8) is mainly used to inject oil, gas, water and other fluids into the authentic sandstone micromodel or photolithographic micromodel, with a maximum repulsion pressure of 70 MPa, displacement flow rate of 0.0000001 to 1 mL/min, and volume resolution of 3.4 pL.

The confining pressure pump (10) is mainly used to simulate the overburden pressure of the formation and protect the microscopic core model (2), with a maximum loaded confining pressure of up to 80 MPa.

The micro-metering pump (9) can not only apply back pressure to the authentic sandstone micromodel or photolithographic micromodel so as to maintain a certain displacement pressure difference at both ends of the microscopic core model (2) to simulate the actual mining process, but also record the fluid volume. The fluid driven out of the microscopic core model (2) flows into the micro-metering pump (9) along the pipe, and the volume of the driven fluid is metered by the volume change in the micro-metering pump (9).

The said differential pressure transmitter 11 is mainly used to monitor the displacement pressure difference between the inlet and outlet of the displacement fluid. The maximum static pressure that can be monitored is 70 MPa, and the pressure difference monitoring range is 0 to 600 kPa.

The present disclosure realizes the dual metering of the driven fluid volume through the micro-metering pump (9) and the micro-flow channel (5) surrounding the outlet of the model. The results for two tests are mutually verified, making the experimental results more convincing. At the same time, in order to reduce the errors generated by the valves and other instruments in the experiment, a high-pressure microvalve with small dead volume is used in this device, so that the overall metering accuracy of this device can reach 10 nL, meeting the accuracy requirements of most current experiments.

The inlet pipe (7) comprises a main pipe of φ3×0.5 mm, and three branch pipes of 0.8×0.2 mm are sleeved inside the main pipe to set three independent flow channels of oil, gas and water respectively; the main pipe is in the circular shape, the spiral shape or the zigzag shape; the circular pipe or the spiral pipe is continuously formed as a return portion in the longitudinal direction, the zigzag pipe is intermittently formed as the return portion in the longitudinal direction, the return portion is arranged in a water bath, and the hot water in the water bath heats the inlet pipe (7), effectively preventing the fluid flowing into the microscopic core model (2) from changing the fluid properties due to great temperature change.

The inlet pipe (7) is provided with a vacuum pump (16) and associated blowoff valve to avoid the air in the inlet pipe (7) from affecting the test results.

In order to avoid the complex structure of the whole device and low instrument sensitivity caused by the use of bulky intermediate vessel, the present disclosure replaces the intermediate vessel with a surrounding pipe (7) with small inlet to convey fluid to the microchip model, therefore, the present disclosure not only greatly simplifies the device structure, reduces the device volume, and improves the sensitivity of the whole device, but also effectively solves the problem of heating the input fluid.

The image acquisition and analysis system comprises a computer (13) and a stereo microscope (6) and a high-speed camera (12) placed above the visual high-temperature and high-pressure kettle (1); the computer (13) is connected with the displacement pump (8), micro-metering pump (9), confining pressure pump (10) and differential pressure transmitter (11) through the data acquisition card to realize the image recognition and acquisition of pores, oil and water in the microscopic core model (2).

A pressure sensor (15) is provided at the outlet of the displacement pump (8) and at the inlet of the microscopic core model (2).

The present disclosure can be used not only for quantitative study a series of experiments related to the microscopic seepage mechanism of the reservoir, such as the migration law of oil and water in the pore throat, the occurrence law of remaining oil, and the optimization of tertiary oil recovery technology, but also used to study on the experiments related to the nonlinear seepage pattern, condensation and anti-condensation of reservoir rocks due to the sensitive testing accuracy and resistance to high temperature and pressure of the device. In this embodiment, microscopic visual water-oil displacement experiment of high-temperature and high-pressure rock is taken as an example to illustrate the specific implementation process of the present disclosure.

The steps of the microscopic visual water-oil displacement experiment of high-temperature and high-pressure rock comprise in order: vacuuming rock sample—saturating experimental water—establishing irreducible water saturation by oil displacing water—making experiment of water displacing oil—ending the experiment, and the above steps are: putting the microscopic core model into the visual high-temperature and high-pressure kettle, vacuuming the microscopic core model (2) to saturate the experimental water, then displacing water by oil at a certain flow rate to obtain irreducible water, and finally conducting water-oil displacement experiment, specifically observing the occurrence characteristics of oil and water and the distribution characteristics of residual oil in the process of water-oil displacement by a stereo microscope, collecting the microscopic images of saturated water state, irreducible water state and residual oil state in a fixed area at the same time, and obtaining the microscopic displacement efficiency of the core by image statistics.

The specific steps are described as follows:

1) vacuuming the microscopic core model. After assembling and commissioning the experimental instrument, fixing the microscopic core model (2) in the visual high-temperature and high-pressure kettle (1), then starting the confining pressure pump (10) and opening the valve of the associated pipe to load the confining pressure to the experimental value into the inner cavity of the visual high-temperature and high-pressure kettle (1), and finally starting the vacuum pump (16) to extract the air in the throat of the microscopic core model (2) generally for more than 4 hours.

2) Saturating the experimental water in the microscopic core model (2). Opening the two high-pressure microvalves at the inlet of water pipe in the inlet pipe (7), and injecting experimental water into the water pipe (add a certain amount of methyl blue reagent to the experimental water to turn the experimental water blue); after the end of vacuuming, turning off the vacuum pump (16), turning on the switches of the visual high-temperature and high-pressure kettle (1) and the water bath, setting the temperature of the water bath, and heating the confining-pressure fluid and the injected fluid of the visual high-temperature and high-pressure reaction kettle (1), meanwhile turning on the displacement pump (8) and slowly pressurizing the microscopic core model, injecting simulated water into the microscopic core model (2), observing the filling of the injected water in the microscopic core model (2) with the stereo microscope (6), turning on the micro-metering pump (9) after the micro-flow channel at the outlet is filled with experimental water to continually displace until all pores in the microscopic core model (2) are filled, turning off the displacement pump (8), the micro-metering pump (9) and the high-pressure microvalve of the water pipe, using the high-speed camera (12) to capture the image of the core with fully saturated water, and making statistics of the saturation of the rock samples.

3) Establishing irreducible water saturation by the displacement of the water by the oil. Opening the two high-pressure microvalves at the inlet of oil pipe in the inlet pipe (7), and injecting experimental water into the oil pipe (add a certain amount of Sudan red reagent to the experimental water to turn the experimental oil red). Opening the displacement pump (8) at the input, the high-pressure microvalve at the inlet of the oil pipe, and the micro-metering pump (9), slowly pressurizing for water drainage by the oil displacement to reach the irreducible water state, and then closing the displacement pump (8) at the input, the high-pressure microvalve at the inlet of the oil pipe, and the micro-metering pump (9), photographing the oil-water seepage pattern during the process of the displacement of the water by the oil and the oil-water occurrence state in irreducible water state in real time with the stereo microscope (6) and the high-speed camera (12), and obtaining the irreducible water saturation of the rock sample by the statistics.

4) Conducting the water-oil displacement experiment. Opening the two high-pressure microvalves at the inlet of water pipe in the inlet pipe (7), and injecting experimental water into the water pipe (add a certain amount of Sudan red reagent to the experimental water to turn the experimental oil red). Opening the displacement pump (8) and the high-pressure microvalve at the inlet of the water pipe to pressurize the water into the microscopic core model (2); at the same time, starting the micro-metering pump (9) to pressurize the outlet of the microscopic core model (2); after reaching pressure balance between the inlet and outlet, slowly increasing the pressure of the displacement pump (8) to conduct the water-oil displacement experiment; metering the volume of the driven water and the driven oil by the microflow channel (5), and observing the oil-water seepage pattern during the process of the displacement of the oil by the water; taking the real-time images of the oil-water distribution during the process of the displacement of the oil by the water, obtaining on the oil-water saturation in the associated state by the statistics, and calculating the microscopic oil displacement efficiency until reaching the residual oil state.

5) Ending the experiment. After the water-oil displacement is finished, turning off the power switch of the visual high-temperature and high-pressure kettle (1) and the water bath, standing for half an hour, slowly reducing the displacement pressure at the inlet and outlet while reducing the confining pressure, and always keeping the confining pressure higher than the displacement pressure. After unloading to atmospheric pressure, taking out the microscopic core model (2) to end the experiment.

The above are not intended to limit the present disclosure in any form. Although the present disclosure has been disclosed as above with embodiments, the embodiments are not intended to limit the present disclosure. Those skilled in the art, within the scope of the technical solution of the present disclosure, can use the disclosed technical content to make a few changes or modify the equivalent embodiment with equivalent changes. Within the scope of the technical solution of the present disclosure, any simple modification, equivalent change and modification made to the above embodiments according to the technical essence of the present disclosure are still regarded as a part of the technical solution of the present disclosure.

What is claimed is:

1. A high-temperature and high-pressure microscopic visual flowing device, comprising a seepage simulation system, a micro-displacement and metering system connected to the seepage simulation system, and an image acquisition and analysis system;
the seepage simulation system consists of a visual high-temperature and high-pressure kettle, a microscopic core model placed in the visual high-temperature and high-pressure kettle, and glass carriers arranged above and below the microscopic core model; the glass carriers are provided with sealing rubber sleeves, and the visual high-temperature and high-pressure kettle is provided with an annular heating jacket; and
an outlet of the microscopic core model is provided with a microflow channel which surrounds the microscopic core model, and the microflow channel is connected to the micro-displacement and metering system through a pipe.

2. The high-temperature and high-pressure microscopic visual flowing device according to claim 1, wherein the micro-displacement and metering system comprises an inlet pipe, a displacement pump connected to an inlet of the microscopic core model by the inlet pipe, a micro-metering pump arranged at the outlet of the microscopic core model, a differential pressure transmitter arranged at both ends of the microscopic core model, and a confining pressure pump arranged on the seepage simulation system.

3. The high-temperature and high-pressure microscopic visual flowing device according to claim 2, wherein the inlet pipe comprises a main pipe, and three branch pipes are sleeved inside the main pipe to set three independent flow channels of oil, gas and water respectively; the main pipe is in a circular shape, a spiral shape or a zigzag shape; the circular pipe or the spiral pipe is continuously formed as a return portion in a longitudinal direction, the zigzag pipe is intermittently formed as the return portion in the longitudinal direction, and the return portion is arranged in a water bath.

4. The high-temperature and high-pressure microscopic visual flowing device according to claim 2, wherein the inlet pipe is provided with a vacuum pump.

5. The high-temperature and high-pressure microscopic visual flowing device according to claim 2, wherein the image acquisition and analysis system comprises a computer, and a stereo microscope above the visual high-temperature and high-pressure kettle and a high-speed camera placed above the visual high-temperature and high-pressure kettle; the computer is connected with the displacement pump, the micro-metering pump, the confining pressure pump and the differential pressure transmitter through a data acquisition card.

6. The high-temperature and high-pressure microscopic visual flowing device according to claim 1, wherein the microflow channel is a transparent pipe with graduations.

7. The high-temperature and high-pressure microscopic visual flowing device according to claim 1, wherein a micro mobile platform is arranged under the seepage simulation system.

8. The high-temperature and high-pressure microscopic visual flowing device according to claim 1, wherein a pressure sensor is provided at an outlet of the displacement pump and at the inlet of the microscopic core model.

9. An experimental method for a high-temperature and high-pressure microscopic visual flowing device, using a high-temperature and high-pressure microscopic visual flowing device, comprising following steps:
S1: vacuuming a microscopic core model: fixing the microscopic core model in a visual high-temperature and high-pressure kettle, and vacuuming the microscopic core model with a vacuum pump;
S2: saturating experimental water in the microscopic core model: injecting simulated water into the microscopic core model, observing a filling of injected simulated water in the microscopic core model with a stereo microscope, and making statistics of a saturation of rock samples in the microscopic core model;
S3: establishing irreducible water saturation by a displacement of the simulated water by oil: slowly pressurizing the microscopic core model for water drainage by an oil displacement to reach an irreducible water state, photographing an oil-water seepage pattern during a process of the displacement of the water by the oil and an oil-water occurrence state in the irreducible water state in a real time with the stereo microscope and a high-speed camera, and obtaining irreducible water saturation of a rock sample in the microscopic core model by the statistics;
S4: conducting a water-oil displacement experiment: conducting the water-oil displacement experiment on the microscopic core model, metering a volume of driven water and driven oil by a microflow channel, observing the oil-water seepage pattern during a process of a displacement of the oil by the water, taking real-time images of an oil-water distribution during the process of the displacement of the oil by the water, obtaining an oil-water saturation in an associated state by the statistics, and calculating microscopic oil displacement efficiency until reaching a residual oil state; and
S5: ending an experiment.

* * * * *